United States Patent Office 3,642,784
Patented Feb. 15, 1972

3,642,784
ALPHA,ALPHA,ALPHA-TRIFLUORO - 6 - SUBSTITUTED - 5 - NITRO-5-TOLUIC ACID, 5'-NITROFURFURYLIDENE HYDRAZIDE COMPOUNDS
Dean E. Welch, Harry S. Nakaue, and Robert D. Vatne, Charles City, Iowa, assignors to Salsbury Laboratories
No Drawing. Filed June 17, 1969, Ser. No. 841,182
Int. Cl. C07d 5/30
U.S. Cl. 260—240 A
6 Claims

ABSTRACT OF THE DISCLOSURE

The compounds of this invention are alpha,alpha,alpha-trifluoro-6-substituted-5-nitro-m-toluic acid, 5' - nitrofurfurylidene hydrazides. These compounds possess useful animal growth-promoting properties and are useful in the control and treatment of blackhead in poultry.

BACKGROUND OF THE INVENTION

This invention relates to the veterinary arts and more particularly to novel chemical compounds and compositions containing the compounds to promote and accelerate growth in domestic animals and to control and treat blackhead in poultry. The compounds can generally be described as alpha,alpha,alpha-trifluoro - 6-substituted-5-nitro-m-toluic acid, 5'-nitrofurfurylidene hydrazides.

It is well recognized among the animal raising industry that a successful operation is dependent upon efficient production management which is geared to the objective of insuring and maintaining the growth and health of the animals. While proper nourishment, enriched with nutritional adjuvants, in conjunction with sanitizing measures is vital for rearing a healthy and productive herd or flock, economic efficiency and profitability in the animal industry make it equally desirable to enhance the physiological development and growth of the animals above and beyond their natural rate of maturation. In so promoting the meat producing capacity of his animals, the raiser will be in the position to bring his animals to market at an earlier date and thereby not only increase the effectiveness of his commercial operation, but also achieve substantial savings in nutritive supplies, especially when the treatment simultaneously increases the feed efficiency of the supplemental basal rations.

Blackhead is a gastro-intestinal infection which occurs in turkeys of all ages, and is also commonly encountered in chickens, guineas, quails, pheasants, and peafowl. To the veterinarian it is known as histomoniasis or infectious enterohepatitis in view of its clinical symptoms manifested by an inflammation of the ceca and liver. Mortality is high and often attains a rate of 100% of the flock. The etiological factor responsible for the infection has been identified as *Histomonas meleagridis*. The parasite is transmitted by the common poultry cecal worm *Heterakis gallinae*, and its eggs in which it is able to live for extended periods of time.

Young poults are susceptible to a rapid onset and short course of the disease, and succumb soon after the appearance of the first symptoms. Adult birds are usually sick for several days before they die and show excessive wasting of flesh. A post-mortem examination reveals multiple ulcerations and lesions of the cecal walls, forming yellowish-green cores in the ceca. The lesions of the liver consist of irregular, reddened, or gray spots to large necrotic areas. In advanced cases, the peritoneum and mesenteric tissues become involved.

SUMMARY OF THE INVENTION

The novel compounds of this invention are alpha,alpha,alpha-trifluoro-6-substituted - 5-nitro-m-toluic acid, 5'-nitrofurfurylidene hydrazides having the general formula

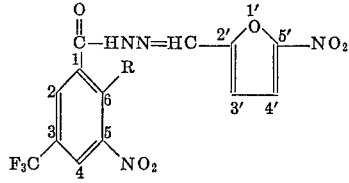

wherein R is selected from the group consisting of chloro, hydroxy, amino and lower alkoxy.

Also an integral part of this invention are veterinary compositions comprising a mixture of at least one of these novel compounds and an acceptable animal foodstuff which can be utilized for promoting growth in domestic animals and/or controlling and treating blackhead in poultry.

DESCRIPTION OF COMPOUNDS AND COMPOSITIONS

The novel chemical compounds of this invention have been found to possess valuable animal growth-promoting properties as well as activity against blackhead in poultry. The compounds may be generally described as alpha,alpha,alpha-trifluoro-6-substituted-5 - nitro-m-toluic acid, 5'-nitrofurfurylidene hydrazides and have the following general formula

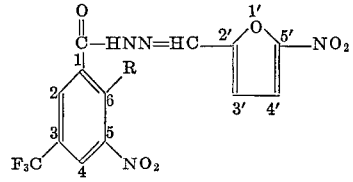

wherein R is selected from the group consisting of chloro, a hydroxy, an amino, or a lower alkoxy group. As used herein, lower alkoxy is used to indicate moieties of 1–4 carbon atoms.

Representative members included within this series of alpha,alpha,alpha - trifluoro - 6-substituted-5-nitro-m-toluic acid, 5'-nitrofurfurylidene hydrazides compounds are:

Alpha,alpha,alpha - trifluoro - 6 - hydroxy-5-nitro-m-toluic acid, 5'-nitrofurfurylidene hydrazide;

6 - amino - alpha,alpha,alpha-trifluoro-5-nitro-m-toluic acid, 5'-nitrofurfurylidene hydrazide;

6-chloro-alpha,alpha,alpha-5-nitro-m-toluic acid, 5'-nitrofurfurylidene hydrazide;

Alpha,alpha,alpha - trifluoro - 6 - methoxy-5-nitro-m-toluic acid, 5'-nitrofurfurylidene hydrazide; and Alpha,alpha,alpha-trifluoro-6-butoxy-5-nitro - m - toluic acid, 5'-nitrofurfurylidene hydrazide.

The series of alpha,alpha,alpha-trifluoro-6-substituted-5-nitro-m-toluic acid, 5'-nitrofurfurylidene hydrazides may be conveniently prepared, using 6-chloro-alpha,alpha,alpha-trifluoro-5-nitro-m-toluic acid as a starting material. The starting material may be obtained in accordance with the method described by Welch et al. in J. Med. Chem., 12, 302 (1969), hereby incorporated by reference.

The 6 - substituted hydroxy compound, alpha,alpha,alpha-trifluoro-6-hydroxy-5-nitro-m-toluic acid, 5'-nitrofurfurylidene hydrazide is prepared by first reacting the starting material hereinbefore described, with an alkoxide of an alkali metal, preferably sodium methoxide to form alpha,alpha,alpha-trifluoro-6-methoxy-5'-nitro - m - toluic acid, which is subsequently reacted with hydrogen bromide to form alpha,alpha,alpha-trifluoro-6-hydroxy-5-nitro-m-toluic acid. This resulting acid is then esterfied with a straight chain alcohol, preferably methanol, and the resulting ester is treated with hydrazine hydrate to form the corresponding hydrazide, which hydrazide is subsequently reacted with 5-nitrofurfural diacetate to form the desired product, alpha,alpha,alpha-trifluoro-6-hydroxy-5-nitro-m-toluic acid, 5'-nitrofurfurylidene hydrazide.

To prepare the 6-substituted lower alkoxy compounds, the starting material 6-chloro-alpha,alpha,alpha-trifluoro-5-nitro-m-toluic acid is reacted with a short chain alkali metal alkoxide of 1–4 carbons, such as sodium methoxide, sodium ethoxide, sodium propoxide or sodium butoxide, to form the corresponding alpha,alpha,alpha-trifluoro-6-alkoxy-5-nitro-m-toluic acid compound. The preferred alkali metal alkoxide is sodium methoxide because the eventual finished product shows better growth promoting and antiblackhead activities. This acid is then halogenated with thionyl chloride to form the corresponding acid halide, which halide is reacted with 5-nitro-2-furfural hydrazone to form the corresponding 6-alkoxy-alpha,alpha,alpha-trifluoro-5-nitro-m-toluic acid, 5'-nitrofurfurylidene hydrazide compound.

6-chloro-alpha,alpha,alpha-trifluoro-5-nitro - m - toluic acid, 5'-nitrofurfurylidene hydrazide is readily prepared by halogenating the starting acid material, as hereinbefore described, with thionyl chloride to form the corresponding aroyl chloride and reacting 5-nitro-2-furfural hydrazone therewith to form the 6-chloro-alpha,alpha,alpha-trifluoro-5-nitro-m-toluic acid, 5-nitrofurfurylidene hydrazide compound.

The 6-substituted amino compound, 6-amino-alpha,alpha,alpha-trifluoro-5-nitro-m-toluic acid, 5'-nitrofurfurylidene hydrazide was prepared by esterifying 6-amino-alpha,alpha,alpha-trifluoro-5-nitro-m-toluic acid prepared in accordance with Welch et al., J. Med. Chem., 12, 302 (1969) with a short chain alcohol of 1–4 carbons. The resultant ester is then reacted with hydrazine hydrate to form the corresponding hydrazide, which is subsequently reacted with 5-nitro-furaldehyde to form the corresponding 6 - amino-alpha,alpha,alpha-trifluoro-5-nitro-m-toluic acid, 5'-nitrofurfurylidene hydrazide product.

The novel compounds of this invention have been found to possess valuable properties for promoting growth in domestic animals and for controlling histomoniasis in poultry. When mixed with a suitable carrier, the compounds have been found to be readily acceptable to the animals and do not interfere with their physiological functions.

As a preferred embodiment, the compounds are administered to the animals in combination with a solid, inert, non-toxic carrier material in which they are uniformly and homogeneously dispersed. Suitable carriers of an ingestible nature may be any kind of foodstuff acceptable to the animal such as ground corn, corn meal, dried distillers grain, citrus meal, ordinary grain, mash, scratch, and any other normal or commercial rations. The so medicated feed is placed before the animals for consumption ad libitum.

The compounds may also be used as active ingredients in liquid compositions. The liquid compositions can be conveniently prepared by either dissolving or suspending the compounds in the animals' drinking water with the help of skim milk, edible oils, syrups or commercial wetting agents and emulsifiers.

Compositions containing a pharmaceutically effective amount of the novel compounds have been fed to chicks, turkey poults, and pigs and have exhibited particular utility in effectively promoting the growth of the animals. Compositions containing concentrations ranging from about 0.0006% to about 0.01% of the compounds have been found to be effective for this use and concentrations of about 0.1% have been dispersed without any adverse reactions. Concentrations ranging from about 0.005% to about 0.01% are preferred owing to the reliability of effect of the compounds in this concentration range and the economy involved in using such a low concentration of drug product.

The hereinbefore described novel compounds, with the exception of the chloro-substituted compound, have also been found to be of beneficial value, when used in pharmaceutically effective amounts, in the control of blackhead or histomoniosis in poultry. Conveniently, the mode of administration of the compounds for blackhead control purposes likewise consists in their incorporation into an orally ingestible non-toxic vehicle, such as an animal feed as hereinbefore described.

Concentrations of the 6-substituted hydroxy compound in the vehicle ranging from about 0.01% to about 0.1% have been found to be effective in controlling blackhead in poultry while a higher concentration of at least .05% for the 6-substituted alkoxy and 6-substituted amino compounds have shown utility. Concentrations of all the compounds ranging from about 0.05% to about 0.1% are preferred since below this range the effective dosage of the compounds may be unreliable.

To facilitate the handling of the small amounts of chemicals to be incorporated into the ultimate medicated ration, a premix can be prepared by grinding a limited quantity of a non-toxic inert vehicle with an amount from 5 to 95% by weight of the compound. In this case, the carrier material may consist of Fuller's earth, talcum, bentonite, ground oyster shells, limestone and divers clays, or edible feed substances such as soybean meal, wheat middlings and corn meal. Such stock concentrates are specifically made and adapted for use in dilutions with an edible carrier so as to conveniently compound the medicated rations at the desired dosage levels. The availability of such concentrates is therefore highly desirable for the feed manufacturer and animal raiser who ordinarily uses one pound of the premix or concentrate for each ton of commercial feed to produce the finished medicated ration.

In summation, the new compositions employing the novel chemical compounds of this invention have been found to increase the weight gain of domestic animals without increasing their ration intake and thereby provide a more efficient animal producing operation whereby the growth of the animals is accelerated to condition the animals for earlier marketing. In addition, the novel compounds have been found to possess activity against blackhead in poultry, thereby enabling a poultry raiser using the compounds of this invention to protect his flocks against blackhead while hastening their growth.

The hereinafter described examples will illustrate in greater detail the synthesis of a number of typical representatives of the novel compounds of this invention. Examples are also provided to illustrate the compounds, utility and application in a commercial mixture.

EXAMPLES

The following examples illustrate specific preferred embodiments of this invention and are not intended to be limiting. Temperatures are expressed in degrees centigrade.

Example I.—Preparation of 6-chloro-alpha,alpha,alpha-trifluoro-5-nitro-m-toluic acid, 5'-nitrofurfurylidene hydrazide from 6 - chloro-alpha,alpha,alpha-trifluoro-5-nitro-m-toluic acid A mixture of 55 g. (0.203 mol) of 6-chloro-alpha,alpha,alpha-trifluoro-5-nitro-m-toluic acid and 150 ml. of thionyl chloride was heated at reflux for 4 hours. The excess thionyl chloride was then removed under vacuum. The resulting residue of crude aroyl chloride was not isolated but was dissolved in 100 ml. of benzene and added slowly to a mixture of 32 g. (0.203 mol) of 5-nitro-2-furfural hydrazone and 150 ml. of pyridine cooled below 40°. The resulting mixture was left to stand overnight and the volatiles were then removed under vacuum. The solid residue was slurried with 5% hydrochloric acid, filtered and finally washed with water. Recrystallization from acetonitrile-water gave 25 g. (30%) of 6-chloro-alpha,alpha,alpha-trifluoro-5-nitro-m-toluic acid, 5′-nitrofurfurylidene hydrazide, a yellow solid found to have a melting point of 192–193°.

*Analysis.*—Calcd. for $C_{13}H_6ClF_3N_4O_6$ (percent): C, 38.39; H, 1.49; N, 13.78. Found (percent): C, 38.07; H, 1.08; N, 13.46.

Major I.R. absorptions: 3500, 3100, 1690, 1625, 1550, 1485, 1347, 1320, 1260, 1177, 1140, 1020, 975, 910 cm.$^{-1}$.

Example II.—Preparation of alpha,alpha,alpha-trifluoro-6-hydroxy-5-nitro-m-toluic acid, 5′-nitrofurfurylidene hydrazide from 6-chloro-alpha,alpha,alpha-trifluoro-5-nitro-m-toluic acid (a) Preparation of alpha,alpha,alpha-trifluoro-6-methoxy-5-nitro-m-toluic acid.—To a mixture of 26.0 g. (0.10 mol) of 6-chloro-alpha,alpha-alpha-trifluoro-5-nitro-m-toluic acid and 100 ml. of anhydrous methanol was added 16.2 g. (0.30 mol) of sodium methoxide. After the exotherm had subsided, the mixture was heated at reflux for 7 hours. The methanol was then removed under vacuum, and the residue was dissolved in 100 ml. of water, treated with activated charcoal and filtered. Acidification of the filtrate with concentrated hydrochloric acid gave 26 g. (98%) of a light tan solid. Recrystallization from water-methanol gave a white solid of alpha,alpha,alpha-trifluoro-6-methoxy-5-nitro-m-toluic acid having a melting point of 140–141°.

*Analysis.*—Calcd. for $C_9H_6F_3NO_5$ (percent): C, 40.78; H, 2.28; N, 5.28. Found (percent): C, 40.42; H, 2.12; N, 5.25.

Major I.R. absorptions: 2490, 3100, 1720, 1630, 1550, 1360, 1330, 1140, 980, 915 cm.$^{-1}$.

(b) Preparation of alpha,alpha,alpha-trifluoro-6-hydroxy-5-nitro-m-toluic acid.—A mixture of 10.0 g. (37.8 mol) of alpha,alpha,alpha-trifluoro-6 methoxy-5-nitro-m-toluic acid and 125 ml. of 48% hydrogen bromide was heated at 120–140° for 4 hours and then cooled. The solid was removed by filtration, washed with water, dried, and recrystallized from a 1:1 hexane-benzene mixture to give 6.8 g. of alpha,alpha,alpha-trifluoro-6-hydroxy-5-nitro-m-toluic acid (72%) as white plates.

*Analysis.*—Calcd. for $C_8H_4F_3NO_5$ (percent): C, 38.26; H, 1.60; N, 5.28. Found (percent): C, 38.29; H, 1.79; N, 5.79.

Major I.R. absorptions: 3500, 3100, 1720, 1645, 1610, 1560, 1450, 1340, 1150, 930, 818 cm.$^{-1}$.

(c) Preparation of alpha,alpha,alpha-trifluoro-6-hydroxy-5-nitro-m-toluic acid, methyl ester.—A solution of 17.1 g. (0.068 mol) of alpha,alpha,alpha-trifluoro-6-hydroxy-5-nitro-m-toluic acid, 250 ml. of methanol, and 5 ml. of concentrated sulfuric acid was heated at reflux for 48 hours. The methanol was then removed under vacuum and the residue was quenched with crushed ice to form a solid which was removed by filtration. The residue was washed with dilute sodium bicarbonate and recrystalized from water-alcohol to give 13.5 g. (75%) as a white solid, having a melting point of 87–89°.

*Analysis.*—Calcd. for $C_9H_6F_3NO_5$ (percent): C, 40.77; H, 2.28; N, 5.28. Found (percent): C, 40.738, H, 2.39; N, 5.58.

Major I.R. absorptions: 3500, 1705, 1638, 1605, 1550, 1450, 1358, 1320, 1260, 1200, 1140, 980, 920 cm.$^{-1}$.

(d) Preparation of alpha,alpha,alpha-trifluoro-6-hydroxy-5-nitro-m-toluic acid, hydrazide.—A solution of 27.6 g. (0.104 mol) of alpha,alpha,alpha-trifluoro-6-hydroxy-5-nitro-m-toluic acid, methyl ester, 37.8 g. (0.755 mol) of hydrazine hydrate, 25 ml. of water and 800 ml. of methanol was heated at reflux for 4 hours. The methanol was then removed under vacuum to give a dark, oily residue which was dissolved in 100 ml. of acetic acid. The acetic acid solution was poured into 400 ml. of ice water to give 21.5 g. (78%) of alpha,alpha,alpha-trifluoro-6-hydroxy-5-nitro-m-toluic acid, hydrazide as a yellow solid which was removed by filtration, washed with water and recrystallized from methanol. The resulting product decomposed at 219–220°.

*Analysis.*—Calcd. for $C_8H_6F_3N_3O_4$ (percent): C, 36.24; H, 2.28; N, 15.85. Found (percent): C, 36.28; H, 2.28; N, 16.23.

Major I.R. absorptions: 3510, 3000, 1680, 1550, 1380, 1310, 1280, 1145, 930, 810 cm.$^{-1}$.

(e) Preparation of alpha,alpha,alpha-trifluoro-6-hydroxy-5-nitro-m-toluic acid, 5′-nitrofurfurylidene hydrazide.—A mixture of 16.2 g. (0.0612 mol) of alpha,alpha,alpha-trifluoro-6-hydroxy-5-nitro-m-toluic acid, hydrazide, 15.2 g. (0.0625 mol) of 5-nitrofurfural diacetate, 185 ml. of alcohol and 93 ml. of concentrated sulfuric acid was prepared. The resulting thick, yellow suspension was heated at reflux for ½ hour and then cooled. The solid was removed by filtration, washed with cold alcohol and recrystallized from acetic acid to give a yield of 18.5 g. (78%) of alpha,alpha,alpha-trifluoro-6-hydroxy-5-nitro-m-toluic acid, 5′-nitrofurfurylidene hydrazide as a yellow solid which decomposed at 227°.

*Analysis.*—Calcd. for $C_{13}H_7F_3N_4O_7$ (percent): C, 40.22; H, 1.82; N, 14.43. Found (percent): C, 40.18; H, 1.70; N, 14.35.

Major I.R. absorptions: 3480, 1675, 1550, 1480, 1350, 1325, 1275, 1200, 1140, 1010, 975, 920, 820 cm.$^{-1}$ EXAMPLE III.—Preparation of 6-amino-alpha,alpha,alpha-trifluoro-5-nitro-m-toluic acid, 5′-nitrofurfurylidene hydrazide from 6-chloro-alpha,alpha,alpha-trifluoro-5-nitro-m-toluic acid (a) Preparation of 6-amino-alpha,alpha,alpha-trifluoro-5-nitro-m-toluic acid.—A mixture of 15 g. (55.8 mmol) of 6-chloro-alpha,alpha,alpha-trifluoro-5-nitro-m-toluic acid and 150 ml. of concentrated ammonium hydroxide was heated at 90–100° in a Parr pressure apparatus for 2 hours. The mixture was then cooled, transferred to an evaporating dish, and left to stand overnight. The resulting crystalline suspension was dissolved in warm water, treated with activated charcoal, and filtered. Acidification of the chilled filtrate with concentrated hydrochloric acid gave 12.2 g. (88%) of 6-amino-alpha,alpha,alpha-trifluoro-5-nitro-m-toluic acid as a yellow precipitate.

*Analysis.*—Calcd. for $C_8H_5F_3N_2O_4$ (percent): C, 38.41; H, 2.02; N, 11.20. Found (percent): C, 38.39; H, 2.06; N, 11.07.

Major I.R. absorptions: 3500, 3120, 1705, 1640, 1580, 1540, 1460, 1430, 1355, 1310, 1280, 1240, 1130 cm.$^{-1}$.

(b) Preparation of 6-amino-alpha,alpha,alpha-trifluoro-5-nitro-m-toluic acid, methyl ester.—A mixture of 10 g. (0.04 mol) of 6-amino-alpha,alpha,alpha-trifluoro-5-nitro-m-toluic acid and 250 ml. of anhydrous methanol was saturated with dry hydrochloric acid and then heated at reflux for 3 hours. The volatiles were then removed under vacuum to give a solid residue which was washed with dilute sodium carbonate solution and removed by filtration. The residue was washed with water and recrystallized from water-alcohol to give 6.2 g. (59%) of 6-amino-alpha,alpha,alpha-trifluoro-5-nitro-m-toluic acid, methyl ester, a yellow solid having a melting point of 86–87°.

*Analysis.*—Calcd. for $C_9H_7F_3N_2O_4$ (percent): C, 40.92; H, 2.67; N, 10.61. Found (percent): C, 40.56; H, 2.66; N, 10.52.

Major I.R. absorptions: 3500, 3120, 2980, 1718, 1645, 1580, 1540, 1460, 1440, 1355, 1280, 1130, 925 cm.$^{-1}$.

(c) Preparation of 6-amino-alpha,alpha,alpha-trifluoro-5-nitro-m-toluic acid, hydrazide.—A mixture of 20.05 g. (0.08 mol) of 6-amino-alpha,alpha,alpha-trifluoro-5-nitro-m-toluic acid, methyl ester, 8.0 g. (0.16 mol) of hydrazine hydrate and 500 ml. of methanol was heated at reflux for 6 hours. The volatiles were then removed under vacuum and the residue recrystallized from benzene-alcohol to give 12.55 g. (63%) of 6-amino-alpha,alpha,alpha-trifluoro-5-nitro-m-toluic acid, hydrazide, a yellow solid having a melting point of 153–154°.

*Analysis.*—Calcd. for $C_8H_7F_3N_4O_3$ (percent): C, 36.37; H, 2.67; N, 21.21. Found (percent): C, 36.45; H, 2.74; N, 20.93.

Major I.R. absorptions: 3400, 3320, 1675, 1585, 1540, 1352, 1310, 1260, 1160, 1138, 1078, 976, 945, 925, 913 cm.$^{-1}$.

(d) Preparation of 6-amino-alpha,alpha,alpha-trifluoro-5-nitro-m-toluic acid, 5'-nitrofurfurylidene hydrazide.—
A solution of 7.06 g. (0.05 mol) of 5-nitro-2-furaldehyde and 12.55 g. (0.05 mol) of 6-amino-alpha,alpha,alpha-trifluoro-5-nitro-m-toluic acid, hydrazide in 400–500 ml. of denatured alcohol was heated slightly until a dense, yellow precipitate formed. The mixture was then cooled and filtered. The residue was recrystallized from acetonitrile to give 15.75 g. (81%) of 6-amino-alpha,alpha,alpha-trifluoro-5-nitro-m-toluic acid, 5'-nitrofurfurylidene hydrazide, an orange-yellow solid found to have a melting point of 256–257°.

*Analysis.*—Calcd. for $C_{13}H_8F_3N_5O_6$ (percent): C, 40.28; H, 2.08; N, 18.16. Found (percent): C, 40.11; H, 2.67; N, 17.47.

Major I.R. absorptions: 3500, 3350, 3150, 1678, 1640, 1575, 1480, 1395, 1360, 1330, 1260, 1120, 1020, 970, 945, 922, 908 cm.$^{-1}$.

Example IV.—Preparation of alpha,alpha,alpha-trifluoro-6-methoxy-5-nitro-m-toluic acid, 5'-nitrofurfurylidene hydrazide from alpha,alpha,alpha-trifluoro-6-methoxy-5-nitro-m-toluic acid Ten grams (0.037 mol) of alpha,alpha,alpha-trifluoro-6-methoxy-5-nitro-m-toluic acid (prepared in accordance with Example II) was heated at reflux for 4 hours with 50 ml. of thionyl chloride. The thionyl chloride was then removed under vacuum and the residue was slowly added to 5.7 g. (0.037 mol) of 5-nitro-2-furfuralhydrazone in 50 ml. of pyridine at 20–30°. The resulting mixture was stirred for ½ hour and then quenched with water to give a precipitate which was removed by filtration. The residue was washed with water and recrystallized from acetonitrile-water to yield 10 g. (67%) of alpha,alpha,alpha-trifluoro-6-methoxy-5-nitro-m-toluic acid, 5'-nitrofurfurylidene hydrazide as a yelow solid found to have a melting point of 223–225°.

*Analysis.*—Calcd. for $C_{14}H_9F_3N_4O_7$ (percent): C, 41.80; H, 2.26; N, 13.93. Found (percent): C, 41.94; H, 2.36; N, 13.95.

Major I.R. absorptions: 3480, 1690, 1655, 1565, 1545, 1485, 1350, 1325, 1260, 1165, 1140, 1080, 1020, 985, 975 cm.$^{-1}$.

When in Example II, sodium ethoxide, sodium propoxide or sodium butoxide is substituted for sodium methoxide, substantially the same results are obtained in that the respective 6-substituted alkoxy toluic acid derivatives are formed. These alkoxy derivatives have substantially the same chemical and pharmacological properties as the methoxy derivative above described.

Example V.—Growth promoting properties of the novel compounds

In the tests tabulated below, a total of 300 newly hatched chicks were treated with compositions containing the novel compounds of this invention in various concentrations thereof for a total of four weeks. Twenty chicks were used for each control as well as for each compound and dosage concentration thereof. The twenty chicks were divided into 2 groups containing 5 male and 5 female chicks each and were placed into thermostatically controlled battery brooders with raised wire floors for the first four weeks of life. All of the chicks were also treated with Newcastle-Infectious bronchitis vaccine in their drinking water at 5 days of age. The tests were of a four week duration, with medicated feed provided for consumption by the chicks ad libitum throughout the four weeks.

To prepare the compound-containing compositions, feed ingredients were weighed out and thoroughly mixed using a vertical auger mixer to manufacture a starter dry-feed diet. After a period of approximately 7 minutes mixing time, all of the finished feed was withdrawn from the mixer. In manufacture of the medicated feed, each drug level was weighed out carefully on an analytical balance and hand mixed in 10 pounds of the finished feed. This drug premix feed was then gradually returned to the batch mixer which contained 90 pounds of finished feed. The addition of the dry premix feed to the mixer was done with the mixer in operation. Approximate mixing time was 7 minutes, and the mixing procedure was carried out for all levels of drugs. Between each batch, the mixer was thoroughly cleaned. The finished medicated feeds were sacked, and feed samples were saved for drug analysis.

Each chick was weighed individually at four weeks of age and the ratios of weight increases were calculated. These figures multiplied by 100 represent the percentage of weight gains attained by the treated birds as compared with the untreated controls. Thus, for example, if the mean weight gain for a group of tested chicks was found to be 687 grams while the control group showed a value of 633 grams, the percentage of weight gain expressed as ratio $T/C$ percent is $$\frac{687}{633} \times 100 = 108.5$$

which means that the stimulative action of the chemical compound produces an increase in meat producing capacity of 8.5%.

Tables I, II and III summarize the experimental findings of three separate tests using the identical procedures and the results are separately tabulated for the male and female chicks. Column 1 lists the active ingredient which was added to the solid feed, with the active ingredients being identified as follows:

(I) 6 - chloro-alpha,alpha,alpha-trifluoro-5-nitro-m-toluic acid, 5'-nitrofurfurylidene hydrazide.
(II) alpha,alpha,alpha - trifluoro - 6 - hydroxy-5-nitro-m-toluic acid, 5'-nitrofurfurylidene hydrazide.
(III) 6-amino-alpha,alpha,alpha-trifluoro-5-nitro-m-toluic acid, 5'-nitrofurfurylidene hydrazide.
(IV) alpha,alpha,alpha-trifluoro - 6 - methoxy-5-nitro-m-toluic acid, 5'-nitrofurfurylidene hydrazide.

Column 2 lists the concentration level of the active ingredients in the feed by weight. Column 3 records in grams the weight of the chicks at four weeks of age after four weeks of treatment, while column 4 translates these values into $T/C$ percent ratios.

TABLE I

| Active ingredient | Concentration. percent | Concluding weight [1] | | $T/C$ percent | |
|---|---|---|---|---|---|
| | | Male | Female | Male | Female |
| Control | | 633 | 589 | 100.00 | 100.00 |
| IV | 0.005 | 687 | 569 | 108.53 | 99.60 |
| IV | 0.01 | 672 | 589 | 106.32 | 100.00 |
| II | 0.005 | 694 | 639 | 109.79 | 108.13 |
| II | 0.01 | 726 | 611 | 114.69 | 103.73 |
| III | 0.005 | 636 | 597 | 100.47 | 101.36 |
| III | 0.01 | 647 | 577 | 102.21 | 97.96 |

[1] See footnote at end of Table III.

TABLE II

| Active ingredient | Concentration. percent | Concluding weight [1] | | $T/C$ percent | |
|---|---|---|---|---|---|
| | | Male | Female | Male | Female |
| Control | | 546 | 502 | 100.00 | 100.00 |
| II | .005 | 605 | 502 | 110.86 | 100.00 |
| II | .01 | 617 | 517 | 113.00 | 102.99 |
| I | .005 | 586 | 500 | 107.33 | 99.60 |
| I | .01 | 533 | 495 | 97.62 | 98.61 |

[1] See footnote at end of Table III.

TABLE III

| Active ingredient | Concentration, percent | Concluding weight [1] Male | Concluding weight [1] Female | T/C percent Male | T/C percent Female |
|---|---|---|---|---|---|
| Control | | 474 | 447 | 100.00 | 100.00 |
| II | 0.0006 | 494 | 426 | 104.45 | 95.30 |
| II | 0.00125 | 507 | 575 | 106.70 | 128.63 |
| II | 0.0025 | 539 | 554 | 113.71 | 123.24 |

[1] Average weight in grams of 10 chicks at end of four week period.

As can be seen from the foregoing tables, the growth promoting activity of the compounds may rise to a level of 114–128% which is a significant increase over the feeding rate of normal physiological development.

Compound II, alpha,alpha,alpha-trifluoro - 6 - hydroxy-5 - nitro - m - toluic acid, 5' - nitrofurfurylidene hydrazide showed activity in concentrations as low as 0.0006% in the male chicks and activity in the female chicks in concentrations as low as 0.00125% while the other three tested compounds were effective in dosages as low as 0.005%.

Comparable results were obtained using compounds II and IV in the same concentrations in similar tests with turkey poults. Also, compound II was tested in young pigs. In this test, the pigs receiving the medicated feed produced better weight gain, feed conversion and average daily gain.

Example VI.—Blackhead control properties of the novel compounds

In the tests tabulated below, a given number of either Broad Breasted Bronze or Broad Breasted White turkey poults were orally inoculated with approximately 1000 embryonated cecal worm (*Heterakis gallinaram*) ova per bird at approximately six weeks of age. Prior experimentation had confirmed the presence of Histomoniasis organisms in those ova. Prior to inoculation, the birds were observed for sickness and unhealthy specimens were replaced. All of the poults were reared in wire-bottom cages and particular care was taken to protect the poults against extraneous exposure to other infected organisms.

All tests were 28 days in duration. Turkeys were infected on the first day of the test. Medicated feed prepared in accordance with Example V was given to the chicks the first 21 days and non-medicated feed the final 7 days of each experiment. All surviving birds were sacrificed at the end of the test.

The criteria of anti-blackhead efficacy in these experiments were (1) the absence of cecal or liver lesions at postmortem examination indicative of non-infection of the birds and (2) the rate of mortality. The readings for each of these two categories were compared with those of infected, but untreated poults which served as controls.

The experimental data on the anti-blackhead effect of the new compounds are summarized in Table IV. In view of the foregoing explanation, the headings of the various columns are self-explanatory.

TABLE IV

| Compound | Conc. in feed, Percent | Total no. of turkeys | Efficacy Percent without blackhead | Percent survival |
|---|---|---|---|---|
| Alpha,alpha,alpha-trifluoro-6-methoxy-5-nitro-*m*-toluic acid, 5'-nitrofurfurylidene hydrazide | 0.05 | 4 | 25 | 25 |
| | 0.025 | 12 | 0 | 0 |
| Infected controls | | 4 | 0 | 0 |
| Alpha, alpha,alpha-trifluoro-6-hydroxy-5-nitro-*m*-toluic acid, 5'-nitrofurfurylidene hydrazide | 0.1 | 4 | 100 | 100 |
| | 0.05 | 12 | 8 | 33 |
| | 0.025 | 8 | 25 | 25 |
| | 0.01 | 8 | 0 | 13 |
| Infected controls | | 12 | 0 | 0 |
| 6-amino-alpha,alpha,alpha-trifluoro-6-nitro-*m*-toluic acid, 5'-nitrofurfurylidene hydrazide | 0.05 | 2 | 0 | 50 |
| Infected controls | | 2 | 0 | 0 |

Table IV indicates that all of the tested compounds exhibited activity against blackhead at concentrations of 0.05% and one compound, alpha,alpha,alpha-trifluoro-6-hydroxy-5-nitro-m-toluic acid, 5'-nitrofurfurylidene hydrazide had activity in concentrations as low as .01% and an efficiency of 100% at a concentration of 0.1%. From a careful analysis of the foregoing table and a comparison of the efficiency of the three compounds tested at various concentrations, it can be fairly concluded that the efficacy of the compounds is directly proportional to their concentrations in the feed rations. Since the tested compounds revealed a substantially similar effectiveness at 0.05% concentrations, it can be reasonably expected that all the compounds will have substantially the same effect at the higher concentration, 0.1%.

Example VII.—Medicated premix

|  | Oz. |
|---|---|
| Alpha,alpha,alpha-trifluoro - 6 - hydroxy-5-nitro-m-toluic acid, 5'-nitrofurfurylidene hydrazide | 3.2 |
| Ground oyster shells | 12.8 |
|  | 16.0 |

The above premix is added to about one ton of commercial feed to prepare a medicated feed containing about 0.01% of alpha,alpha,alpha-trifluoro-6-hydroxy-5-nitro-m-toluic acid, 5'-nitrofurfurylidene hydrazide.

What we claim is:

1. Alpha,alpha-alpha-trifluoro - 6 - substituted-5-nitro-m-toluic acid, 5'-nitrofurfurylidene hydrazide having the following formula

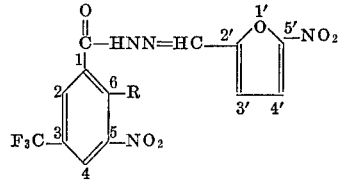

wherein R is selected from the group consisting of chloro, hydroxy, amino and lower alkoxy.

2. The chemical compound described in claim 1 wherein the lower alkoxy group has one to four carbon atoms.

3. The chemical compound as described in claim 1 wherein R is chloro, which compound is 6-chloro-alpha, alpha,alpha-trifluoro - 5 - nitro-m-toluic acid, 5'-nitrofurfurylidene hydrazide.

4. The chemical compound as described in claim 1 wherein R is hydroxy, which compound is alpha,alpha,alpha-trifluoro-6-hydroxy-5-nitro-m-toluic acid, 5'-nitrofurfurylidene hydrazide.

5. The chemical compound as described in claim 1 wherein R is amino, which compound is 6-amino-alpha,alpha,alpha-trifluoro-5-nitro-m-toluic acid, 5'-nitrofurfurylidene hydrazide.

6. The chemical compound as described in claim 1 wherein R is methoxy, which compound is alpha,alpha,alpha-trifluoro-6-methoxy - 5 - nitro-m-toluic acid, 5'-nitrofurfurylidene hydrazide.

References Cited

UNITED STATES PATENTS 3,330,724  7/1967  Van Essen et al. ____ 260—240 X

OTHER REFERENCES

German printed application (Auslegeschrift) No. 1,283,244, 3 pages specification, November 1968.

JOHN D. RANDOLPH, Primary Examiner

U.S. Cl. X.R.

99—2, 4; 260—471 R, 515 A, 518 A, 521 A, 544 M; 424—285